United States Patent
Wang et al.

(10) Patent No.: US 11,398,034 B2
(45) Date of Patent: Jul. 26, 2022

(54) METHOD AND APPARATUS FOR TRAINING SEMANTIC SEGMENTATION MODEL, COMPUTER DEVICE, AND STORAGE MEDIUM

(71) Applicant: PING AN TECHNOLOGY (SHENZHEN) CO., LTD., Guangdong (CN)

(72) Inventors: Jianzong Wang, Guangdong (CN); Chenyu Wang, Guangdong (CN); Jin Ma, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 80 days.

(21) Appl. No.: 16/759,383

(22) PCT Filed: Jul. 13, 2018

(86) PCT No.: PCT/CN2018/095673
§ 371 (c)(1),
(2) Date: Apr. 27, 2020

(87) PCT Pub. No.: WO2019/200758
PCT Pub. Date: Oct. 24, 2019

(65) Prior Publication Data
US 2020/0294240 A1 Sep. 17, 2020

(30) Foreign Application Priority Data
Apr. 20, 2018 (CN) .................... 201810362207.1

(51) Int. Cl.
| | |
|---|---|
| G06T 7/10 | (2017.01) |
| G06K 9/62 | (2022.01) |
| G06N 3/06 | (2006.01) |
| G06N 3/08 | (2006.01) |
| G06N 3/04 | (2006.01) |
| G06V 10/26 | (2022.01) |
| G06V 10/82 | (2022.01) |

(52) U.S. Cl.
CPC ................ *G06T 7/10* (2017.01); *G06K 9/623* (2013.01); *G06K 9/6256* (2013.01); *G06N 3/061* (2013.01); *G06N 3/08* (2013.01)

(58) Field of Classification Search
CPC ............. G06T 7/10; G06T 2207/20084; G06T 2207/20081; G06T 7/11; G06K 9/623; G06K 9/6256; G06K 9/34; G06K 9/6271; G06K 9/342; G06K 9/726; G06N 3/061; G06N 3/08; G06N 3/0454
See application file for complete search history.

(56) References Cited

U.S. PATENT DOCUMENTS

| | | | | |
|---|---|---|---|---|
| 10,157,331 | B1 * | 12/2018 | Tang | G06V 20/00 |
| 10,311,335 | B1 * | 6/2019 | Kim | G06V 20/70 |
| 10,410,096 | B2 * | 9/2019 | Dijkman | G06K 9/6267 |
| 2019/0057507 | A1 * | 2/2019 | El-Khamy | G06V 20/70 |

* cited by examiner

*Primary Examiner* — John W Lee

(57) ABSTRACT

A method and apparatus for training a semantic segmentation model, a computer device, and a storage medium are described herein. The method includes: constructing a training sample set; inputting the training sample set into a deep network model for training; inputting the training sample set into a weight transfer function for training to obtain a bounding box prediction mask parameter; and constructing a semantic segmentation model.

12 Claims, 3 Drawing Sheets

METHOD AND APPARATUS FOR TRAINING SEMANTIC SEGMENTATION MODEL, COMPUTER DEVICE, AND STORAGE MEDIUM

The present application claims priority to Chinese Patent Application No. 201810362207.1, filed with the National Intellectual Property Administration, PRC on Apr. 20, 2018, and entitled "METHOD AND APPARATUS FOR TRAINING SEMANTIC SEGMENTATION MODEL, COMPUTER DEVICE, AND STORAGE MEDIUM", which is incorporated herein by reference in its entirety.

TECHNICAL FIELD

The present disclosure relates to the field of computer technologies, and in particular, to a method and apparatus for training a semantic segmentation model, a computer device, and a storage medium.

BACKGROUND

The statements in this section merely provide background information related to the present disclosure and do not necessarily constitute prior art.

Image semantic segmentation means that a machine automatically segments an image and recognizes content in the image. For example, if a photo of a person riding a motorcycle is provided, the motorcycle and the person each are segmented from the photo. During semantic segmentation of the image, it is necessary to obtain a segmentation mask to segment the image. At present, the segmentation mask cannot be derived from a bounding box. Therefore, during training, to segment the image, all instances need to be marked with the segmentation mask.

SUMMARY

A method for training a semantic segmentation model, including the following steps:

constructing a training sample set, where the training sample set includes first-category objects and second-category objects, where the first-category objects are marked with bounding boxes and segmentation masks, and the second-category objects are marked with bounding boxes;

inputting the training sample set into a deep network model for training to obtain first bounding box parameters and first mask parameters of the first-category objects and second bounding box parameters of the second-category objects; and inputting the first bounding box parameters and the first mask parameters into a weight transfer function for training to obtain a bounding box prediction mask parameter; and inputting the first bounding box parameters, the first mask parameters, the second bounding box parameters and the bounding box prediction mask parameter into the deep network model and the weight transfer function to construct a semantic segmentation model.

An apparatus for training a semantic segmentation model, including:

a first construction unit, configured to construct a training sample set, where the training sample set includes first-category objects and second-category objects, where the first-category objects are marked with bounding boxes and segmentation masks, and the second-category objects are marked with bounding boxes;

a training unit, configured to input the training sample set into a deep network model for training to obtain first bounding box parameters and first mask parameters of the first-category objects and second bounding box parameters of the second-category objects, and input the first bounding box parameters and the first mask parameters into a weight transfer function for training to obtain a bounding box prediction mask parameter; and a second construction unit, configured to input the first bounding box parameters, the first mask parameters, the second bounding box parameters, and the bounding box prediction mask parameter into the deep network model and the weight transfer function to construct a semantic segmentation model.

A computer device, including a memory and a processor, where the memory stores computer readable instructions, and when the processor executes the computer readable instructions, steps of the method described above are implemented.

A non-volatile computer readable storage medium storing computer readable instructions, where when the computer readable instructions are executed by a processor, steps of the method described above are implemented.

DETAILED DESCRIPTION

Figure 1:
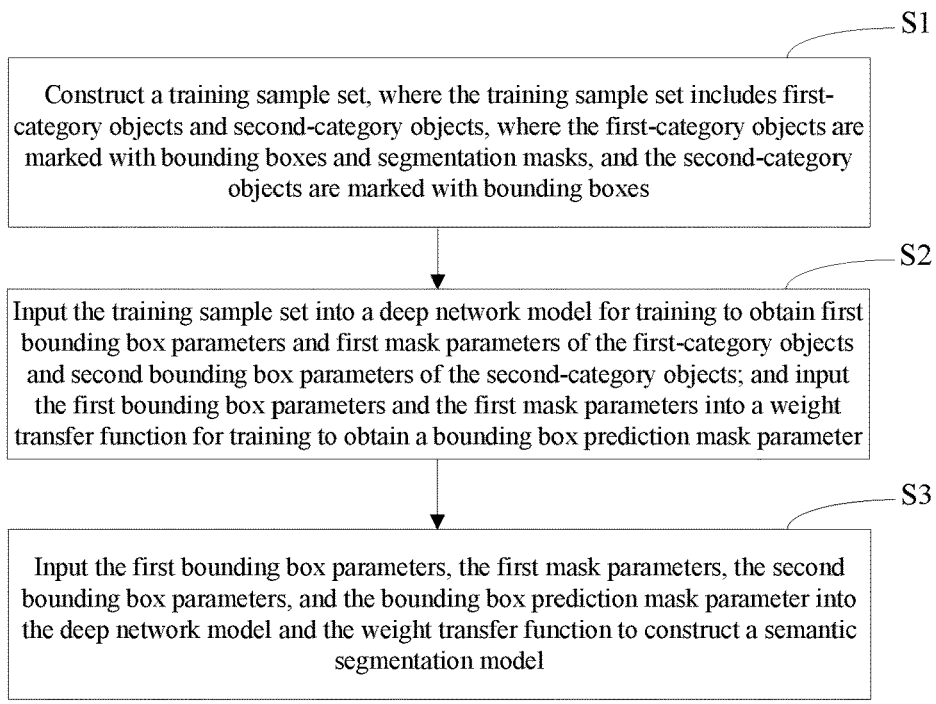
FIG. 1 is a schematic diagram of steps of a method for training a semantic segmentation model according to some embodiments.

Referring to FIG. 1, some embodiments provide a method for training a semantic segmentation model, including the following steps.

Step S1: Construct a training sample set, where the training sample set includes a plurality of first-category objects and a plurality of second-category objects, where the first-category objects are marked with bounding boxes and segmentation masks, and the second-category objects are marked with bounding boxes.

Marking with a bounding box is to annotate a target object with a box. Marking with a segmentation mask (a mask annotation) is to mark an object along its outline. In comparison, the bounding box annotation is low in cost because it is easy to annotate. Moreover, the mask annotation is difficult to annotate, so the annotation cost is high.

According to the current state of semantic segmentation, it can be known that if an image is to be semantically segmented, segmentation masks of each category of objects in this image need to be obtained. To obtain the segmentation masks, it is necessary to obtain mask parameters corresponding to the objects of this category by pre-training, and the mask parameters can be obtained by annotating the image of the training sample set with the segmentation mask and inputting the training sample set into a deep network model for training. Generally, if object categories in an image to be semantically segmented are a human and a tree, it is necessary to annotate segmentation masks of the human and the tree in a training sample set, then training is performed to obtain the mask parameters of the human and the tree, and then the human and the tree are segmented in the image to be segmented. That is, for the number of categories included in an image to be semantically segmented, it is necessary to annotate objects with the same number of segmentation masks when training samples are produced. However, there are many different categories of objects in nature, and the cost of mask annotations is too high to annotate all categories of objects.

In step S1, the training sample set includes a large number of object categories. For example, object categories in an image include a large number of categories of objects such as a human, a tree, a car, and a train. It can be understood that the more the categories of objects in the training sample set are, the more favorable it is for the semantic segmentation model to perform subsequent semantic segmentation of the image. It should be noted that the first-category objects or second-category objects do not simply refer to one category of objects exclusively. Instead, each of them represents a series of objects. More precisely, there are multiple first-category and second-category objects, each of the former is marked with a bounding box and a segmentation mask, and each of the latter is marked with a bounding box only.

In some embodiments, the number of second-category objects is much greater than the number of first-category objects, and a small number of first-category objects reduce the training cost. For example, in at least one embodiment, the training sample set includes 100 categories of objects. According to the method for constructing the training sample set in step S1, only 20 categories of objects therein need to be annotated with a segmentation mask and a bounding box, while the remaining 80 categories of objects only need to be annotated with a bounding box. Compared with a current technology in which all the 100 categories of objects need to be annotated with segmentation masks and bounding boxes, the method enables the segmentation mask for the 80 categories of objects to be less annotated, thus greatly reducing the labeling cost.

In some embodiments, the constructed training sample set includes first-category objects and second-category objects, where the first-category objects are marked with bounding boxes and segmentation masks, and the second-category objects are only marked with bounding boxes. The training sample set is a mixture of complete annotation data (a category with a segmentation mask) and weak annotation data (a category with only a bounding box), so a task of training based on the training sample set is called a partial supervision task. Then, the method for training a semantic segmentation model according to at least one embodiment is actually a method for semantic segmentation training based on partial supervised learning. The main benefit of the partial supervised learning training sample set is that the partial supervised learning training sample set allows it to construct a large-scale instance segmentation model by using two types of existing data sets.

In summary, in the training sample set constructed in one or more embodiments, only some categories of objects are marked with segmentation masks, and it is not necessary to mark all categories of objects with segmentation masks, which greatly reduces the cost of constructing the training sample set and reduces subsequent training cost and training calculation pressure, thereby improving training efficiency.

S2: Input the training sample set into a deep network model for training to obtain first bounding box parameters and first mask parameters of the first-category objects and second bounding box parameters of the second-category objects; and input the first bounding box parameters and the first mask parameters into a weight transfer function for training to obtain a bounding box prediction mask parameter.

In step S2, the foregoing constructed training sample set is input into a deep network model for training, a corresponding first bounding box parameter and a corresponding first mask parameter are obtained by training by using the bounding box and the segmentation mask for marking the first-category object, and a corresponding second bounding box parameter is obtained by training by using the bounding box for marking the second-category object. In at least one embodiment, a weight transfer function is also trained while the deep network model is trained. The weight transfer function is trained to predict a segmentation mask parameter (namely an instance segmentation parameter) of a category by using the bounding box parameters of the image category. The weight transfer function can be used in Mask R-CNN to perform end-to-end training by using categories with mask annotations as supervised learning data. During reasoning, the weight transfer function is configured to predict an instance segmentation parameter of each category, thus enabling the semantic segmentation model to segment all target categories, including target categories (such as second-category objects) that do not have mask annotations during training.

Specifically, the foregoing weight transfer function obtains a bounding box prediction mask parameter by training by using the first bounding box parameter and the first mask parameter described above, and the bounding box prediction mask parameter refers to a parameter that predicts a corresponding mask of a certain category object by using a bounding box of the certain category object. After the parameter is obtained through training, when the image to be segmented is semantically segmented, a corresponding bounding box can be predicted first, and then a mask parameter is predicted by using the bounding box, thereby achieving semantic segmentation. The specific implementation process will be described in the following, which will not be described in detail here.

Since only some categories of objects in the training sample set constructed above are marked with a segmentation mask, in the training process of this step, the pressure of training samples and training calculation can be greatly reduced, and the training efficiency can be improved.

S3: Input the first bounding box parameters, the first mask parameters, the second bounding box parameters, and the bounding box prediction mask parameter into the deep network model and the weight transfer function to construct a semantic segmentation model.

The first bounding box parameters, the first mask parameters, the second bounding box parameters, and the bounding box prediction mask parameter described above are training parameters of the semantic segmentation model in some embodiments. If a semantic segmentation model is used to semantically segment an image, segmentation masks of each category of objects in this image need to be obtained. To obtain the segmentation mask, it is necessary to obtain mask parameters (namely training parameters in the existing semantic segmentation model) corresponding to the objects of this category by pre-training; that is, if a semantic segmentation model for semantic segmentation of an image is to be obtained, the mask parameters need to be obtained first, and as described in step S1 above, the training cost for obtaining the corresponding mask parameters directly by mask annotation is higher. Therefore, training parameters obtained by training in some embodiments are the first bounding box parameters, the first mask parameters, the second bounding box parameters, and the bounding box prediction mask parameter described above, and the foregoing training parameters are correspondingly input into the deep network model and the weight transfer function to construct a semantic segmentation model suitable for semantic segmentation of images.

Figure 2:
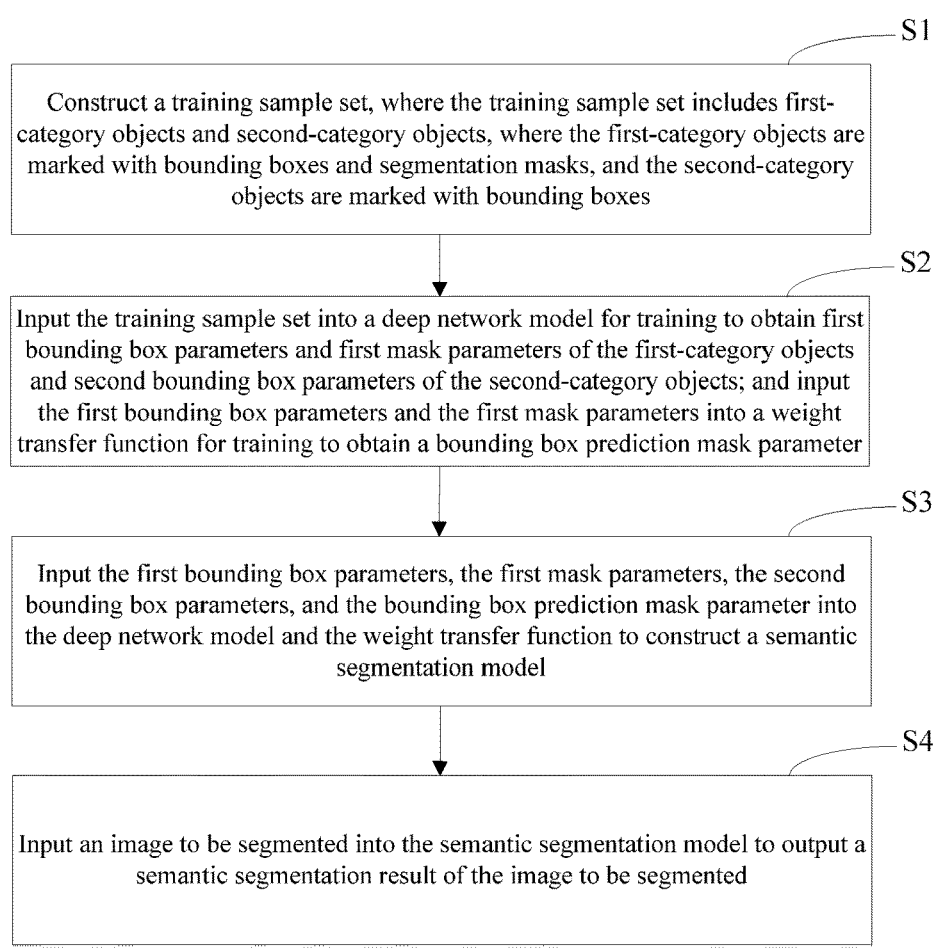
FIG. 2 is a schematic diagram of steps of a method for training a semantic segmentation model according to some embodiments.

Referring to FIG. 2, in some embodiments, after step S3 of inputting the first bounding box parameters, the first mask parameters, the second bounding box parameters, and the bounding box prediction mask parameter into the deep network model and the weight transfer function to construct a semantic segmentation model, the method includes the following step.

Step S4: Input an image to be segmented into the semantic segmentation model to output a semantic segmentation result of the image to be segmented.

Specifically, the step S4 of inputting an image to be segmented into the semantic segmentation model to output a semantic segmentation result of the image to be segmented includes the following steps.

a. The image to be segmented is input into the semantic segmentation model, bounding boxes of first-category objects in the image to be segmented are predicted by using the first bounding box parameters, and bounding boxes of second-category objects in the image to be segmented are predicted by using the second bounding box parameters.

In step a, the image to be segmented is input into the semantic segmentation model, and bounding boxes of the first-category objects and the second-category objects in the image to be segmented can be directly predicted.

b. Mask parameters of the first-category objects in the image to be segmented are predicted by using the bounding boxes of the first-category objects and the bounding box prediction mask parameters, and mask parameters of the second-category objects in the image to be segmented are predicted by using the bounding boxes of the second-category objects and the bounding box prediction mask parameter.

In step b, the bounding boxes of the first-category objects and the bounding boxes of the second-category objects predicted in step a are input into a weight transfer function for calculation, and then the mask parameters of the first-category objects and the mask parameters of the second-category objects in the image to be segmented can be predicted.

c. Semantic segmentation is performed on the first-category objects and the second-category objects in the image to be segmented by using the mask parameters of the first-category objects and the mask parameters of the second-category objects in the image to be segmented.

After the mask parameters of the first-category objects and the mask parameters of the second-category objects in the image to be segmented are obtained in step b, in step c, segmentation masks corresponding to the first-category objects and the second-category objects in the image to be segmented can be obtained, and then the image to be segmented is semantically segmented by using the segmentation masks.

In at least one embodiment, the deep network model is a Mask-RCNN network model. The Mask-RCNN network model is an existing model, and Mask R-CNN is an extension on Faster R-CNN, i.e., adding a parallel branch for predicting a target mask on the existing branch for border recognition. Mask R-CNN includes two branches, one is a bounding box prediction branch and the other is a mask prediction branch. In Mask R-CNN, the last layer of the bounding box prediction branch and the last layer of the mask prediction branch contain category parameters (including a bounding box parameter and a mask parameter) used to perform bounding box classification and instance mask prediction tasks for each category. For example, a bounding box parameter can be predicted by using a bounding box through the bounding box prediction branch, and a corresponding mask parameter can be predicted by using a segmentation mask through the mask prediction branch.

The foregoing Mask R-CNN method is essentially to learn a bounding box parameter and a mask parameter of a certain category respectively. Moreover, in some embodiments, a weight transfer function is also trained while the Mask-RCNN network model is trained. Specifically, the foregoing weight transfer function is trained between the last layer of the bounding box branch and the last layer of the mask branch, the foregoing training sample set is input into the Mask R-CNN network, the weight transfer function is used for training until a loss function converges, and then the training parameters of the semantic segmentation model in some embodiments are obtained by training.

Specifically, an expression of the foregoing weight transfer function is:

$$\omega_{seg}^{c} = \tau(\omega_{det}^{c}; \theta)$$

$$\omega_{det}^{c} = [\omega_{cls}^{c}, \omega_{box}^{c}]$$

where $\tau$ denotes a transfer function, $\omega_{cls}$ denotes a weight of a category, $\omega_{box}$ denotes a weight of a bounding box, $\omega_{det}$ denotes a merged vector, $\theta$ denotes a learning parameter of an unknown category, and $\omega_{seg}$ denotes a bounding box prediction mask parameter.

In at least one embodiment, the weight transfer function is a two-layer fully connected neural network, where the two fully connected layers have 5120 neurons and 256 neurons, respectively, and an activation function used is LeakyReLU. The activation function has characteristics of nonlinearity, differentiability, monotonicity, and the like.

In at least one embodiment, after the image to be segmented is semantically segmented by using a semantic segmentation model, that is, after outlines of objects are drawn, objects of different categories are annotated with different RGB colors for highlighting, and RGB colors with larger differences are used for filling between adjacent objects; or the category of the object can be identified based on the contour of the object and the scene, and a corresponding (similar) image can be called from a database to fill in the segmented object.

In at least one embodiment, after the image to be segmented is semantically segmented by using the semantic segmentation model, that is, after the outlines of objects are drawn, the corresponding part of each object is cut out separately to generate a new layer, that is, each object correspondingly generates an image. Finally, a background corresponding to the layer can also be selected for synthesis with the layer.

According to the method for training a semantic segmentation model provided by some embodiments, a constructed training sample set includes first-category objects and second-category objects, where the first-category objects are marked with bounding boxes and segmentation masks, and the second-category objects are only marked with bounding boxes, and it is not necessary to mark all categories of objects with segmentation masks, thereby greatly reducing the marking cost of the training sample set, reducing the pressure of subsequent training samples and training calculations and improving training efficiency; the training sample set is input into a deep network model and a weight transfer function for training to obtain a bounding box prediction mask parameter, so that mask parameter of objects of a certain category can be predicted by using bounding boxes of the objects, thereby semantically segmenting the objects of this category, and the segmentation cost is low.

Figure 3:
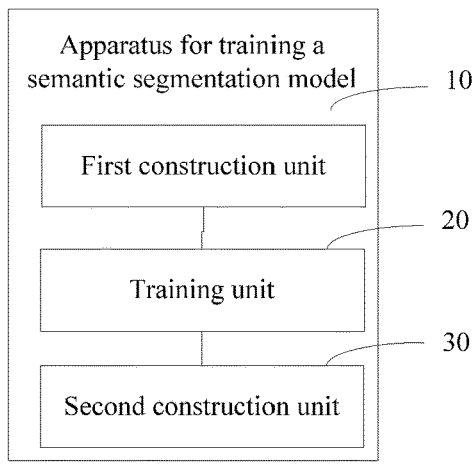
FIG. 3 is a structural block diagram of an apparatus for training a semantic segmentation model according to some embodiments.

Referring to FIG. 3, some embodiments also provide an apparatus for training a semantic segmentation model, including:

a first construction unit 10, configured to construct a training sample set, where the training sample set includes first-category objects and second-category objects, where the first-category objects are marked with bounding boxes and segmentation masks, and the second-category objects are marked with bounding boxes.

Marking with a bounding box is to annotate a target object with a box. Marking with a segmentation mask (mask annotation) is to mark an object along its outline. In comparison, the bounding box annotation is low in cost because it is easy to annotate; and the mask annotation is difficult to annotate, so the annotation cost is high.

According to the current state of semantic segmentation, it can be known that if an image is to be semantically segmented, segmentation masks of each category of objects in this image need to be obtained. To obtain the segmentation masks, it is necessary to obtain mask parameters corresponding to the objects of this category by pre-training, and the mask parameter can be obtained by annotating the image of the training sample set with the segmentation mask and inputting the training sample set into a deep network model for training. Generally, if object categories in an image to be semantically segmented are a human and a tree, it is necessary to annotate segmentation masks of the human and the tree in a training sample set, then training is performed to obtain the mask parameters of the human and the tree, and then the human and the tree are segmented in the image to be segmented. That is, for the number of categories included in an image to be semantically segmented, it is necessary to annotate objects with the same number of segmentation masks when training samples are produced. However, there are many different categories of objects in nature, and the cost of mask annotations is too high to annotate all categories of objects.

In some embodiments, the training sample set constructed by the first construction unit 10 includes a large number of object categories. For example, object categories in an image include a large number of categories of objects such as a human, a tree, a car, and a train. It can be understood that the more the categories of objects in the training sample set are, the more favorable it is for the semantic segmentation model to perform subsequent semantic segmentation of the image. It should be noted that the first-category objects or the second-category objects do not simply refer to only one category of objects, but represent a series of objects. That is, there are multiple first-category objects and multiple second-category objects, which only need to satisfy that the first-category objects are marked with bounding boxes and segmentation masks, and the second-category objects are only marked with bounding boxes.

In some embodiments, the number of second-category objects is much greater than the number of first-category objects, and a small number of first-category objects reduce the training cost. For example, in at least one embodiment, the training sample set includes 100 categories of objects. According to the process of constructing a training sample set by the first construction unit 10, only 20 categories of objects therein need to be annotated with a segmentation mask and a bounding box, while the remaining 80 categories of objects only need to be annotated with a bounding box. Compared with a current technology in which all the 100 categories of objects need to be annotated with a segmentation mask and a bounding box, the method enables the segmentation mask for the 80 categories of objects to be less labeled, thus greatly reducing the labeling cost.

In some embodiments, the constructed training sample set includes first-category objects and second-category objects, where the first-category objects are marked with bounding boxes and segmentation masks, and the second-category objects are only marked with bounding boxes. The training sample set is a mixture of complete annotation data (a category with a segmentation mask) and weak annotation data (a category with only a bounding box), so a task of training based on the training sample set is called a partial supervision task. Then, the method for training a semantic segmentation model according to at least one embodiment is actually a method for semantic segmentation training based on partial supervised learning. The main benefit of the partial supervised learning training sample set is that the partial supervised learning training sample set allows it to construct a large-scale instance segmentation model by using two types of existing data sets.

In the training sample set constructed in one or more embodiments, only some categories of objects are marked with a segmentation mask, and it is not necessary to mark all categories of objects with the segmentation mask, which greatly reduces the cost of constructing the training sample set and reduces subsequent training cost and training calculation pressure, thereby improving training efficiency.

A training unit 20, configured to input the training sample set into a deep network model for training to obtain first bounding box parameters and first mask parameters of the first-category objects and second bounding box parameters of the second-category objects; and input the first bounding box parameters and the first mask parameters into a weight transfer function for training to obtain a bounding box prediction mask parameter.

In some embodiments, the training unit 20 inputs the training sample set constructed by the foregoing first construction unit 10 into a deep network model for training, a corresponding first bounding box parameter and a corresponding first mask parameter are obtained by training by using the bounding box and the segmentation mask for marking the first-category objects, and a corresponding second bounding box parameter is obtained by training by using the bounding box for marking the second-category objects. In at least one embodiment, a weight transfer function is also trained while the deep network model is trained. The weight transfer function is trained to predict a segmentation mask parameter (namely an instance segmentation parameter) of a category by using the bounding box parameters of the image category. The weight transfer function can be used in Mask R-CNN to perform end-to-end training by using categories with mask annotations as supervised learning data. During reasoning, the weight transfer function is configured to predict an instance segmentation parameter of each category, thus enabling the semantic segmentation model to segment all target categories, including target categories (such as the second-category object) that do not have mask annotations during training.

Specifically, the foregoing weight transfer function obtains a bounding box prediction mask parameter by training by using the first bounding box parameter and the first mask parameter described above, and the bounding box prediction mask parameter refers to a parameter that predicts corresponding masks of objects of a certain category by using bounding boxes of objects of the certain category. After the parameter is obtained through training, when the image to be segmented is semantically segmented, its corresponding bounding box can be predicted first, and then its mask parameter is predicted by using the bounding box, thereby achieving semantic segmentation. The specific implementation process will be described in the following, which will not be described in detail here.

Since only some categories of objects in the training sample set constructed above are marked with a segmentation mask, in the training process of this step, the pressure of training samples and training calculation can be greatly reduced, and the training efficiency can be improved.

A second construction unit 30, configured to input the first bounding box parameters, the first mask parameters, the second bounding box parameters, and the bounding box prediction mask parameter into the deep network model and the weight transfer function to construct a semantic segmentation model.

The first bounding box parameters, the first mask parameters, the second bounding box parameters, and the bounding box prediction mask parameter described above are training parameters of the semantic segmentation model in some embodiments. If a semantic segmentation model is used to semantically segment an image, segmentation masks of each category of objects in this image need to be obtained. To obtain the segmentation masks, it is necessary to obtain a mask parameter (namely a training parameter in the semantic segmentation model) corresponding to objects of this category by pre-training; that is, if a semantic segmentation model for semantic segmentation of an image is to be obtained, the mask parameters need to be obtained first, and as described in the foregoing embodiments, the training cost for obtaining the corresponding mask parameters directly by mask annotation is higher. Therefore, training parameters obtained by training in some embodiments are the first bounding box parameters, the first mask parameters, the second bounding box parameters, and the bounding box prediction mask parameter described above, and the foregoing parameters are correspondingly input into the deep network model and the weight transfer function to construct a semantic segmentation model suitable for semantic segmentation of images.

Figure 4:
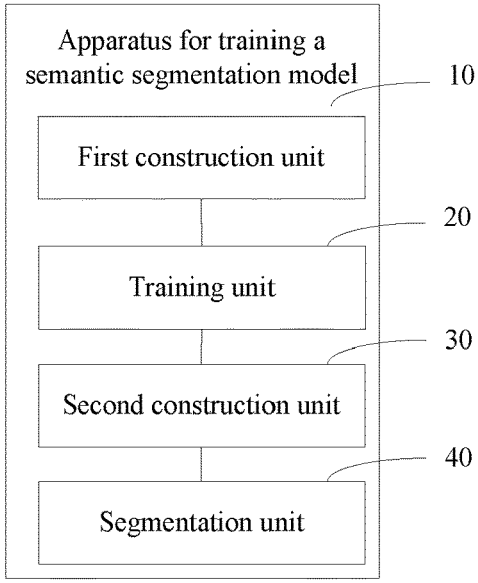
FIG. 4 is a structural block diagram of an apparatus for training a semantic segmentation model according to some embodiments

Referring to FIG. 4, in some embodiments, the foregoing apparatus for training a semantic segmentation model also includes:

a segmentation unit 40, configured to input an image to be segmented into the semantic segmentation model to output a semantic segmentation result of the image to be segmented.

Figure 5:
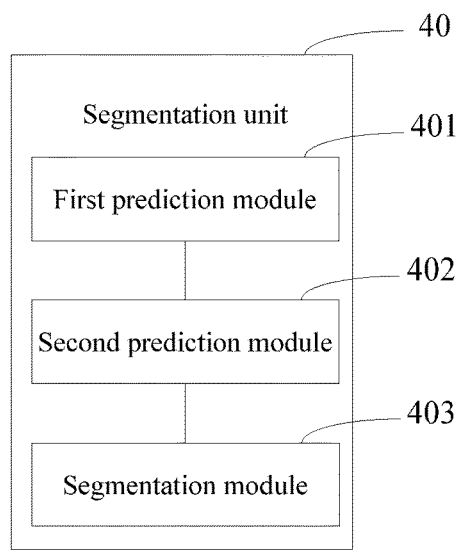
FIG. 5 is a structural block diagram of a segmentation unit according to some embodiments.

Specifically, referring to FIG. 5, the foregoing segmentation unit 40 includes a first prediction module 401, a second prediction module 402, and a segmentation module 403.

The first prediction module 401 is configured to input the image to be segmented into the semantic segmentation model, predict bounding boxes of the first-category objects in the image to be segmented by using the first bounding box parameters, and predict bounding boxes of the second-category objects in the image to be segmented by using the second bounding box parameters.

The first prediction module 401 inputs the image to be segmented into the semantic segmentation model, and bounding boxes of the first-category objects and the second-category objects in the image to be segmented can be directly predicted.

The second prediction module 402 is configured to predict the mask parameters of the first-category objects and the mask parameters of the second-category objects in the image to be segmented by using the bounding boxes of the first-category objects, the bounding boxes of the second-category objects, and the bounding box prediction mask parameter, respectively.

The second prediction module 402 inputs the bounding boxes of the first-category objects and the bounding boxes of the second-category objects predicted by the first prediction module 401 into a weight transfer function for calculation, and then the mask parameters of the first-category objects and the mask parameters of the second-category objects in the image to be segmented can be predicted.

The segmentation module 403 is configured to perform image semantic segmentation on the first-category objects and the second-category objects in the image to be segmented by using the mask parameters of the first-category objects and the mask parameters of the second-category objects in the image to be segmented.

After the second prediction module 402 obtains the mask parameters of the first-category objects and the mask parameters of the second-category objects in the image to be segmented, the segmentation module 403 can obtain segmentation masks corresponding to the first-category objects and the second-category objects, and then perform semantic segmentation on the image to be segmented by using the segmentation masks.

In at least one embodiment, the deep network model is a Mask-RCNN network model. The Mask-RCNN network model is an existing model, and Mask R-CNN is an extension on Faster R-CNN, i.e., adding a parallel branch for predicting a target mask on its existing branch for border recognition. Mask R-CNN includes two branches, one is a bounding box prediction branch and the other is a mask prediction branch. In Mask R-CNN, the last layer of the bounding box prediction branch and the last layer of the mask prediction branch contain category parameters (including a bounding box parameter and a mask parameter) used to perform bounding box classification and instance mask prediction tasks for each category. For example, a bounding box parameter can be predicted by using a bounding box through the bounding box prediction branch, and a corresponding mask parameter can be predicted by using a segmentation mask through the mask prediction branch.

The foregoing Mask R-CNN method is essentially to learn a bounding box parameter and a mask parameter of a certain category respectively. In some embodiments, a weight transfer function is also trained while the Mask-RCNN network model is trained. Specifically, the foregoing weight transfer function is trained between the last layer of the bounding box branch and the last layer of the mask branch, the foregoing training sample set is input into the Mask R-CNN network, the weight transfer function is used for training until a loss function converges, and the then training parameters of the semantic segmentation model in some embodiment are obtained by training.

Specifically, an expression of the foregoing weight transfer function is:

$$\omega_{seg}^c = \tau(\omega_{det}^c; \theta)$$

$$\omega_{det}^c = [\omega_{cls}^c, \omega_{box}^c]$$

where τ denotes a transfer function, $\omega_{cls}$ denotes a weight of a category, $\omega_{box}$ denotes a weight of a bounding box, $\omega_{det}$ denotes a merged vector, θ denotes a learning parameter of an unknown category, and $\omega_{seg}$ denotes a bounding box prediction mask parameter.

In at least one embodiment, the weight transfer function is a two-layer fully connected neural network, where the two fully connected layers have 5120 neurons and 256 neurons, respectively, and an activation function used is LeakyReLU. The activation function has characteristics of nonlinearity, differentiability, monotonicity, and the like.

In at least one embodiment, after the image to be segmented is semantically segmented by using a semantic segmentation model, that is, after outlines of objects are drawn, objects of different categories are annotated with different RGB colors for highlighting, and RGB colors with larger differences are used for filling between adjacent objects; or the category of the objects can be identified based on the contour of the object and the scene, and a corresponding (similar) image can be called from a database to fill in the segmented object.

In some embodiments, after the image to be segmented is semantically segmented by using the semantic segmentation model, that is, after the outlines of objects are drawn, the corresponding part of each object is cut out separately to generate a new layer, that is, each object correspondingly generates an image. Finally, a background corresponding to the layer can also be selected for synthesis with the layer.

According to the apparatus for training a semantic segmentation model provided by some embodiments, a constructed training sample set includes first-category objects and second-category objects, where the first-category objects are marked with bounding boxes and segmentation masks, the second-category objects are only marked with bounding boxes, and it is not necessary to mark all categories of objects with segmentation masks, thereby greatly reducing the marking cost of the training sample set, reducing the pressure of subsequent training samples and training calculations and improving training efficiency; the training sample set is input into a deep network model and a weight transfer function for training to obtain a bounding box prediction mask parameter, so that mask parameters of objects of a certain category can be predicted by using a bounding box of the objects, thereby semantically segmenting the object of this category, and the segmentation cost is low.

Figure 6:
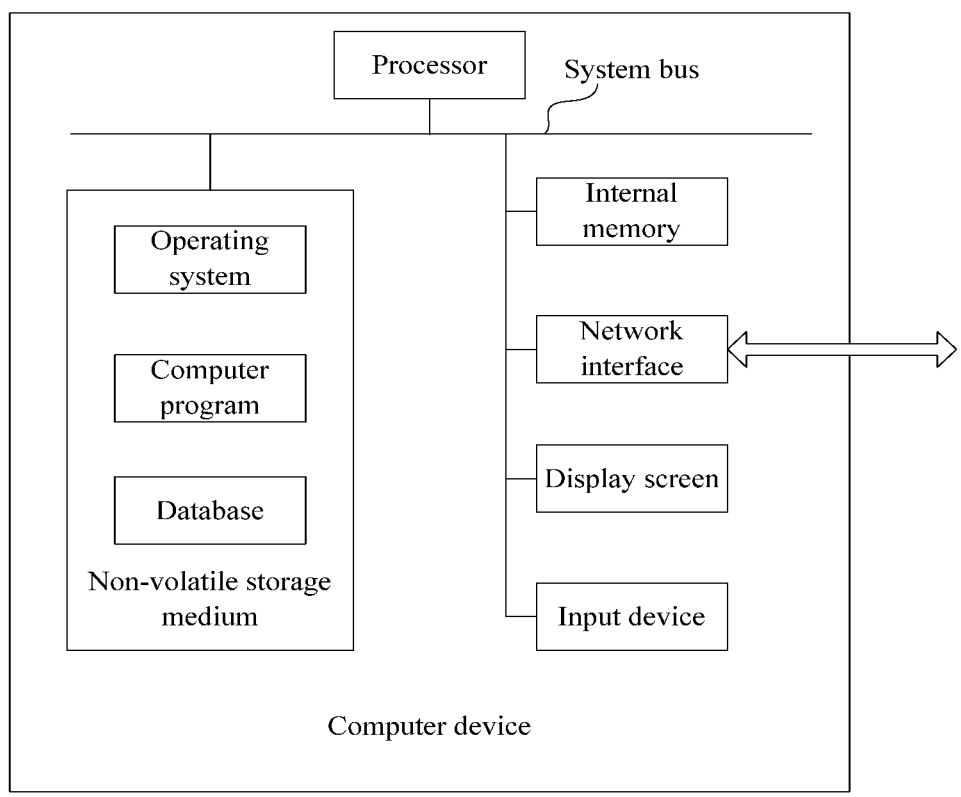
FIG. 6 is a schematic structural block diagram of a computer device according to some embodiments.

Referring to FIG. 6, some embodiments also provide a computer device, which may be a server, and an internal structure thereof may be as shown in FIG. 6. The computer device includes a processor, a memory, a network interface and a database which are connected through a system bus. The processor designed by the computer is configured to provide computing and control capabilities. The memory of the computer device includes a non-volatile storage medium and an internal memory. The non-volatile storage medium stores an operating system, computer readable instructions, and a database. The internal memory provides an environment for the operation of the operating system and the computer readable instructions in the non-volatile storage medium. The database of the computer device is configured to store data such as a semantic segmentation model. The network interface of the computer device is configured to communicate with an external terminal through a network. The computer readable instructions are executed by a processor to implement a method for training a semantic segmentation model.

The foregoing method for training a semantic segmentation model executed by the foregoing processor includes steps of constructing a training sample set, where the training sample set includes first-category objects and second-category objects, where the first-category objects are marked with bounding boxes and segmentation masks, and the second-category objects are marked with bounding boxes;

inputting the training sample set into a deep network model for training to obtain first bounding box parameters and first mask parameters of the first-category objects and second bounding box parameters of the second-category objects; and inputting the first bounding box parameters and the first mask parameters into a weight transfer function for training to obtain a bounding box prediction mask parameter; and inputting the first bounding box parameters, the first mask parameters, the second bounding box parameters, and the bounding box prediction mask parameter into the deep network model and the weight transfer function to construct a semantic segmentation model.

In some embodiments, after the step of inputting, by the processor, the first bounding box parameters, the first mask parameters, the second bounding box parameters, and the bounding box prediction mask parameter into the deep network model and the weight transfer function to construct a semantic segmentation model, the method includes:

inputting an image to be segmented into the semantic segmentation model to output a semantic segmentation result of the image to be segmented.

In some embodiments, the step of inputting, by the processor, an image to be segmented into the semantic segmentation model to output a semantic segmentation result of the image to be segmented includes:

inputting the image to be segmented into the semantic segmentation model, predicting bounding boxes of the first-category objects in the image to be segmented by using the first bounding box parameters, and predicting bounding boxes of the second-category objects in the image to be segmented by using the second bounding box parameters;

predicting the mask parameters of the first-category objects in the image to be segmented by using the bounding boxes of the first-category objects and the bounding box prediction mask parameter, and predicting the mask parameters of the second-category objects in the image to be segmented by using the bounding boxes of the second-category objects and the bounding box prediction mask parameter; and performing semantic segmentation on the first-category objects and the second-category objects in the image to be segmented by using the mask parameters of the first-category objects and the mask parameters of the second-category objects in the image to be segmented.

In some embodiments, the foregoing deep network model is a Mask-RCNN network model.

In some embodiments, an expression of the foregoing weight transfer function is:

$$\omega_{seg}^c = \tau(\omega_{det}^c; \theta)$$

$$\omega_{det}^c = [\omega_{cls}^c, \omega_{box}^c]$$

where τ denotes a transfer function, $\omega_{cls}$ denotes a weight of a category, $\omega_{box}$ denotes a weight of a bounding box, $\omega_{det}$ denotes a merged vector, θ denotes a learning parameter of an unknown category, and $\omega_{seg}$ denotes a bounding box prediction mask parameter.

In at least one embodiment, the weight transfer function is a two-layer fully connected neural network, where the two fully connected layers have 5120 neurons and 256 neurons, respectively, and an activation function used is LeakyReLU.

In at least one embodiment, the number of the second-category objects is greater than the number of first-category objects.

Those skilled in the art can understand that the structure shown in FIG. 6 is merely a block diagram of a partial structure related to the solution, and does not constitute a limitation on the computer device to which the solution is applied.

Some embodiments also provide a non-volatile computer readable storage medium storing computer readable instructions. When the computer readable instructions are implemented by the processor, a method for training a semantic segmentation model is implemented, specifically including: constructing a training sample set, where the training sample set includes first-category objects and second-category objects, where the first-category objects are marked with bounding boxes and segmentation masks, and the second-category objects are marked with bounding boxes;

inputting the training sample set into a deep network model for training to obtain first bounding box parameters and first mask parameters of the first-category objects and second bounding box parameters of the second-category objects; and inputting the first bounding box parameters and the first mask parameters into a weight transfer function for training to obtain a bounding box prediction mask parameter; and inputting the first bounding box parameters, the first mask parameters, the second bounding box parameters, and the bounding box prediction mask parameter into the deep network model and the weight transfer function to construct a semantic segmentation model.

In some embodiments, after the step of inputting, by the processor, the first bounding box parameters, the first mask parameters, the second bounding box parameters, and the bounding box prediction mask parameter into the deep network model and the weight transfer function to construct a semantic segmentation model, the method includes:

inputting an image to be segmented into the semantic segmentation model to output a semantic segmentation result of the image to be segmented.

In some embodiments, the step of inputting, by the processor, an image to be segmented into the semantic segmentation model to output a semantic segmentation result of the image to be segmented includes:

inputting the image to be segmented into the semantic segmentation model, predicting bounding boxes of the first-category objects in the image to be segmented by using the first bounding box parameters, and predicting bounding boxes of the second-category objects in the image to be segmented by using the second bounding box parameters;

predicting the mask parameters of the first-category objects in the image to be segmented by using the bounding boxes of the first-category objects and the bounding box prediction mask parameter, and predicting the mask parameters of the second-category objects in the image to be segmented by using the bounding boxes of the second-category objects and the bounding box prediction mask parameter; and performing semantic segmentation on the first-category objects and the second-category objects in the image to be segmented by using the mask parameters of the first-category objects and the mask parameters of the second-category objects in the image to be segmented.

In some embodiments, the foregoing deep network model is a Mask-RCNN network model.

In some embodiments, an expression of the foregoing weight transfer function is:

$$\omega_{seg}^c = \tau(\omega_{det}^c; \theta)$$

$$\omega_{det}^c = [\omega_{cls}^c, \omega_{box}^c]$$

where τ denotes a transfer function, $\omega_{cls}$ denotes a weight of a category, $\omega_{box}$ denotes a weight of a bounding box, $\omega_{det}$ denotes a merged vector, θ denotes a learning parameter of an unknown category, and $\omega_{seg}$ denotes a bounding box prediction mask parameter.

In at least one embodiment, the weight transfer function is a two-layer fully connected neural network, where the two fully connected layers have 5120 neurons and 256 neurons, respectively, and an activation function used is LeakyReLU.

In at least one embodiment, the number of the second-category objects is greater than the number of first-category objects.

According to the method and apparatus for training a semantic segmentation model, the computer device, and the storage medium provided by some embodiments, a constructed training sample set includes first-category objects and second-category objects, where the first-category objects are marked with bounding boxes and segmentation masks, the second-category objects are only marked with bounding boxes, and it is not necessary to mark all categories of objects with segmentation masks, thereby greatly reducing the marking cost of the training sample set, reducing the pressure of subsequent training samples and training calculations and improving training efficiency; the training sample set is input into a deep network model and a weight transfer function for training to obtain a bounding box prediction mask parameter, so that mask parameters of objects of a certain category can be predicted by using bounding boxes of the objects, thereby semantically segmenting the objects of this category, and the segmentation cost is low.

Those of ordinary skill in the art can understand that all or part of processes for implementing the methods of the foregoing embodiments may be implemented through hardware related to computer readable instructions. The computer readable instructions may be stored in a non-volatile computer readable storage medium. When the computer readable instructions are executed, processes of the methods of the embodiments described above may be included. Any reference to a memory, storage, a database, or other media provided and used in the various embodiments may include a non-volatile memory and/or volatile memory. The non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration and not limitation, the RAM is available in a variety of formats, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), Memory Bus (Rambus) Direct RAM (RDRAM), a Direct Memory Bus Dynamic RAM (DRDRAM), and a Memory Bus Dynamic RAM (RDRAM).

It should be noted that the term "comprise", "include", or any other variant thereof is intended to encompass a non-exclusive inclusion, such that a process, device, article, or method that includes a series of elements including not only those elements, but also other elements not explicitly listed, or elements that are inherent to such a process, device, article, or method. Without more restrictions, an element defined by the phrase "including a . . . " does not exclude the presence of another same element in a process, device, article, or method that includes the element.

The above descriptions are only some embodiments of the present disclosure, and are not intended to limit the patent scope of the present disclosure. Any equivalent structure or equivalent process transformation performed using the specification and the accompanying drawings of the present disclosure may be directly or indirectly applied to other related technical fields and similarly falls within the patent protection scope of the present disclosure.

What is claimed is:

1. A method for training a semantic segmentation model, comprising:
    constructing a training sample set, wherein the training sample set comprises a plurality of first-category objects and a plurality of second-category objects, wherein the first-category objects are marked with bounding boxes and segmentation masks, and the second-category objects are marked with bounding boxes;
    inputting the training sample set into a deep network model for training to obtain first bounding box parameters and first mask parameters of the first-category objects and second bounding box parameters of the second-category objects; and inputting the first bounding box parameters and the first mask parameters into a weight transfer function for training to obtain a bounding box prediction mask parameter; and
    inputting the first bounding box parameters, the first mask parameters, the second bounding box parameters, and the bounding box prediction mask parameter into the deep network model and the weight transfer function to construct a semantic segmentation model;
    wherein a category number of the second-category objects is greater than that of the first-category objects;
    wherein the deep network model is a Mask-RCNN network model;
    wherein an expression of the weight transfer function is:

$\omega_{seg}^c = \tau(\omega_{det}^c; \theta)$ $w_{det}^c = [w_{cls}^c, w_{box}^c]$ wherein $\tau$ denotes a transfer function, $\omega_{cls}$ denotes a weight of a category, $\omega_{box}$ denotes a weight of a bounding box, $\omega_{det}$ denotes a merged vector, $\theta$ denotes a learning parameter of an unknown category, and $\omega_{seg}$ denotes the bounding box prediction mask parameter.

2. The method for training a semantic segmentation model according to claim 1, wherein after the step of inputting the first bounding box parameters, the first mask parameters, the second bounding box parameters, and the bounding box prediction mask parameter into the deep network model and the weight transfer function to construct a semantic segmentation model, the method comprises:
    inputting an image to be segmented into the semantic segmentation model to output a semantic segmentation result of the image to be segmented.

3. The method for training a semantic segmentation model according to claim 2, wherein the step of inputting an image to be segmented into the semantic segmentation model to output a semantic segmentation result of the image to be segmented comprises:
    inputting the image to be segmented into the semantic segmentation model, predicting bounding boxes of the first-category objects in the image to be segmented by using the first bounding box parameters, and predicting bounding boxes of the second-category objects in the image to be segmented by using the second bounding box parameters;
    predicting mask parameters of the first-category objects in the image to be segmented by using the bounding boxes of the first-category objects and the bounding box prediction mask parameter, and predicting mask parameters of the second-category objects in the image to be segmented by using the bounding boxes of the second-category objects and the bounding box prediction mask parameter; and
    performing semantic segmentation on the first-category objects and the second-category objects in the image to be segmented by using the mask parameters of the first-category objects and the mask parameters of the second-category objects in the image to be segmented.

4. The method for training a semantic segmentation model according to claim 1, wherein the weight transfer function is a two-layer fully connected neural network, wherein the two fully connected layers have 5120 neurons and 256 neurons, respectively, and an activation function used is LeakyReLU.

5. A computer device, comprising a memory storing computer readable instructions and a processor, wherein a method for training a semantic segmentation model is implemented when the processor executes the computer readable instructions, and the method comprises:
    constructing a training sample set, wherein the training sample set comprises first-category objects and second-category objects, wherein the first-category objects are marked with bounding boxes and segmentation masks, and the second-category objects are marked with bounding boxes;
    inputting the training sample set into a deep network model for training to obtain first bounding box parameters and first mask parameters of the first-category objects and second bounding box parameters of the second-category objects; and inputting the first bounding box parameters and the first mask parameters into a weight transfer function for training to obtain a bounding box prediction mask parameter; and
    inputting the first bounding box parameters, the first mask parameters, the second bounding box parameters, and the bounding box prediction mask parameter into the deep network model and the weight transfer function to construct a semantic segmentation model;
    wherein a category number of the second-category objects is greater than that of the first-category objects;
    wherein the deep network model is a Mask-RCNN network model;
    wherein an expression of the weight transfer function is:

$\omega_{seg}^c = \tau(\omega_{det}^c; \theta)$ $w_{det}^c = [w_{cls}^c, w_{box}^c]$ wherein $\tau$ denotes a transfer function, $\omega_{cls}$ denotes a weight of a category, $\omega_{box}$ denotes a weight of a bounding box, $\omega_{det}$ denotes a merged vector, $\theta$ denotes a learning parameter of an unknown category, and $\omega_{seg}$ denotes the bounding box prediction mask parameter.

6. The computer device according to claim 5, wherein after the step of inputting, by the processor, the first bounding box parameters, the first mask parameters, the second bounding box parameters, and the bounding box prediction mask parameter into the deep network model and the weight transfer function to construct a semantic segmentation model, the method comprises:

inputting an image to be segmented into the semantic segmentation model to output a semantic segmentation result of the image to be segmented.

7. The computer device according to claim 6, wherein the step of inputting, by the processor, an image to be segmented into the semantic segmentation model to output a semantic segmentation result of the image to be segmented comprises:

inputting the image to be segmented into the semantic segmentation model, predicting bounding boxes of the first-category objects in the image to be segmented by using the first bounding box parameters, and predicting bounding boxes of the second-category objects in the image to be segmented by using the second bounding box parameters;

predicting mask parameters of the first-category objects in the image to be segmented by using the bounding boxes of the first-category objects and the bounding box prediction mask parameter, and predicting mask parameters of the second-category objects in the image to be segmented by using the bounding boxes of the second-category objects and the bounding box prediction mask parameter; and performing semantic segmentation on the first-category objects and the second-category objects in the image to be segmented by using the mask parameters of the first-category objects and the mask parameters of the second-category objects in the image to be segmented.

8. The computer device according to claim 5, wherein the weight transfer function is a two-layer fully connected neural network, wherein the two fully connected layers have 5120 neurons and 256 neurons, respectively, and an activation function used is LeakyReLU.

9. A non-transitory computer readable storage medium storing computer readable instructions, wherein a method for training a semantic segmentation model is implemented when the computer readable instructions are executed by a processor, and the method comprises:

constructing a training sample set, wherein the training sample set comprises first-category objects and second-category objects, wherein the first-category objects are marked with bounding boxes and segmentation masks, and the second-category objects are marked with bounding boxes;

inputting the training sample set into a deep network model for training to obtain first bounding box parameters and first mask parameters of the first-category objects and second bounding box parameters of the second-category objects; and inputting the first bounding box parameters and the first mask parameters into a weight transfer function for training to obtain a bounding box prediction mask parameter; and inputting the first bounding box parameters, the first mask parameters, the second bounding box parameters, and the bounding box prediction mask parameter into the deep network model and the weight transfer function to construct a semantic segmentation model;

wherein a category number of the second-category objects is greater than that of the first-category objects;

wherein the deep network model is a Mask-RCNN network model;

wherein an expression of the weight transfer function is:

$$\omega_{seg}^c = \tau(\omega_{det}^c; \theta) \quad w_{det}^c = [w_{cls}^c, w_{box}^c]$$

wherein $\tau$ denotes a transfer function, $\omega_{cls}$ denotes a weight of a category, $\omega_{box}$ denotes a weight of a bounding box, $\omega_{det}$ denotes a merged vector, $\theta$ denotes a learning parameter of an unknown category, and $\omega_{seg}$ denotes the bounding box prediction mask parameter.

10. The non-transitory computer readable storage medium according to claim 9, wherein after the step of inputting, by the processor, the first bounding box parameters, the first mask parameters, the second bounding box parameters, and the bounding box prediction mask parameter into the deep network model and the weight transfer function to construct a semantic segmentation model, the method comprises:

inputting an image to be segmented into the semantic segmentation model to output a semantic segmentation result of the image to be segmented.

11. The non-transitory computer readable storage medium according to claim 10, wherein the step of inputting, by the processor, an image to be segmented into the semantic segmentation model to output a semantic segmentation result of the image to be segmented comprises:

inputting the image to be segmented into the semantic segmentation model, predicting bounding boxes of the first-category objects in the image to be segmented by using the first bounding box parameters, and predicting bounding boxes of the second-category objects in the image to be segmented by using the second bounding box parameters;

predicting mask parameters of the first-category objects in the image to be segmented by using the bounding boxes of the first-category objects and the bounding box prediction mask parameter, and predicting mask parameters of the second-category objects in the image to be segmented by using the bounding boxes of the second-category objects and the bounding box prediction mask parameter; and performing semantic segmentation on the first-category objects and the second-category objects in the image to be segmented by using the mask parameters of the first-category objects and the mask parameters of the second-category objects in the image to be segmented.

12. The non-transitory computer readable storage medium according to claim 9, wherein the weight transfer function is a two-layer fully connected neural network, wherein the two fully connected layers have 5120 neurons and 256 neurons, respectively, and an activation function used is LeakyReLU.

* * * * *